Nov. 22, 1932.   F. H. STROUD   1,888,639
BRAKE TESTER FOR MOTOR VEHICLE WHEELS
Filed July 3, 1929   4 Sheets-Sheet 1

Inventor
F. H. Stroud.
By Lacey & Lacey, Attorneys

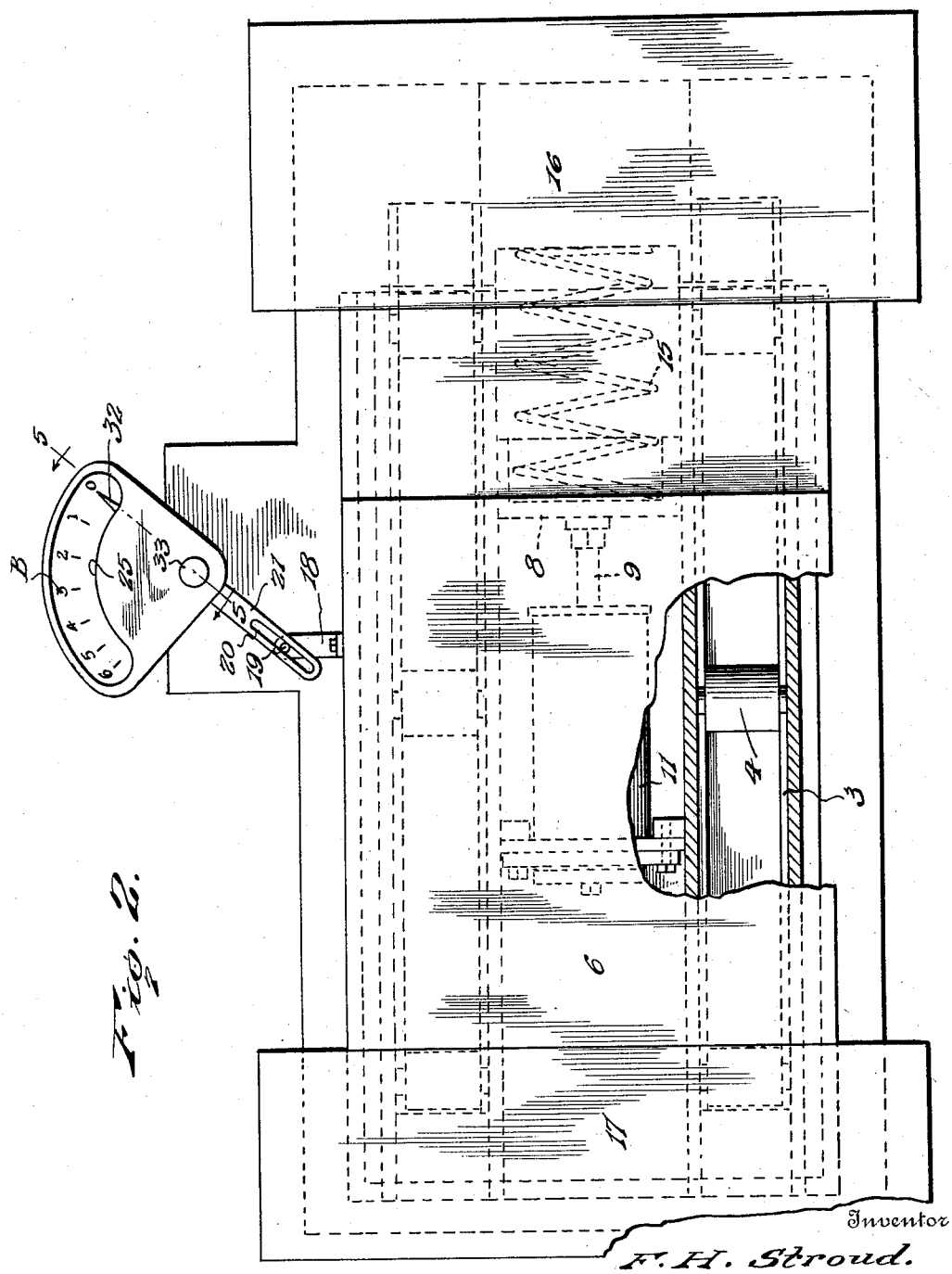

Nov. 22, 1932.   F. H. STROUD   1,888,639
BRAKE TESTER FOR MOTOR VEHICLE WHEELS
Filed July 3, 1929   4 Sheets-Sheet 3
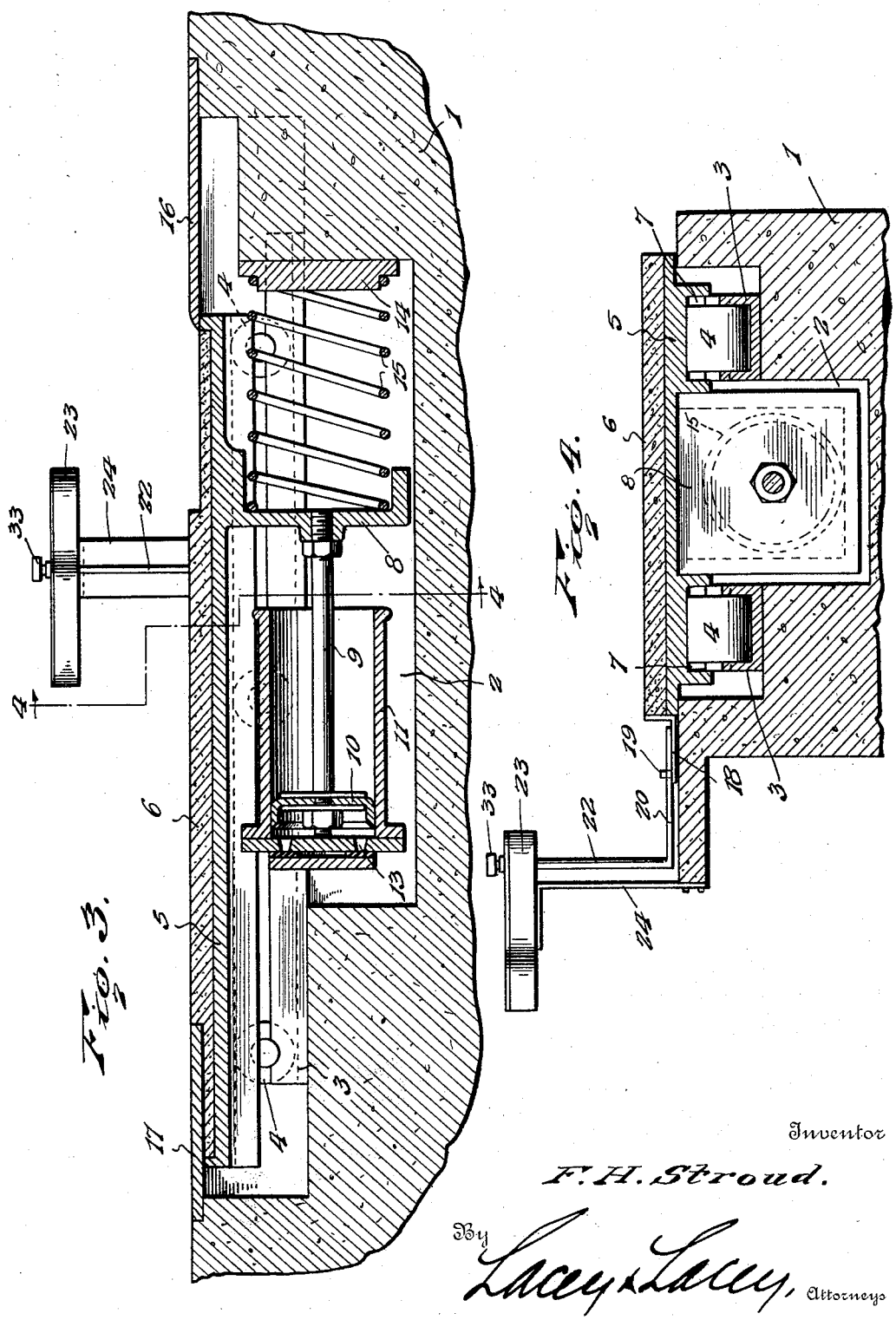
Inventor
F. H. Stroud.
By Lacey & Lacey, Attorneys Nov. 22, 1932.　　　F. H. STROUD　　　1,888,639
BRAKE TESTER FOR MOTOR VEHICLE WHEELS
Filed July 3, 1929　　4 Sheets-Sheet 4
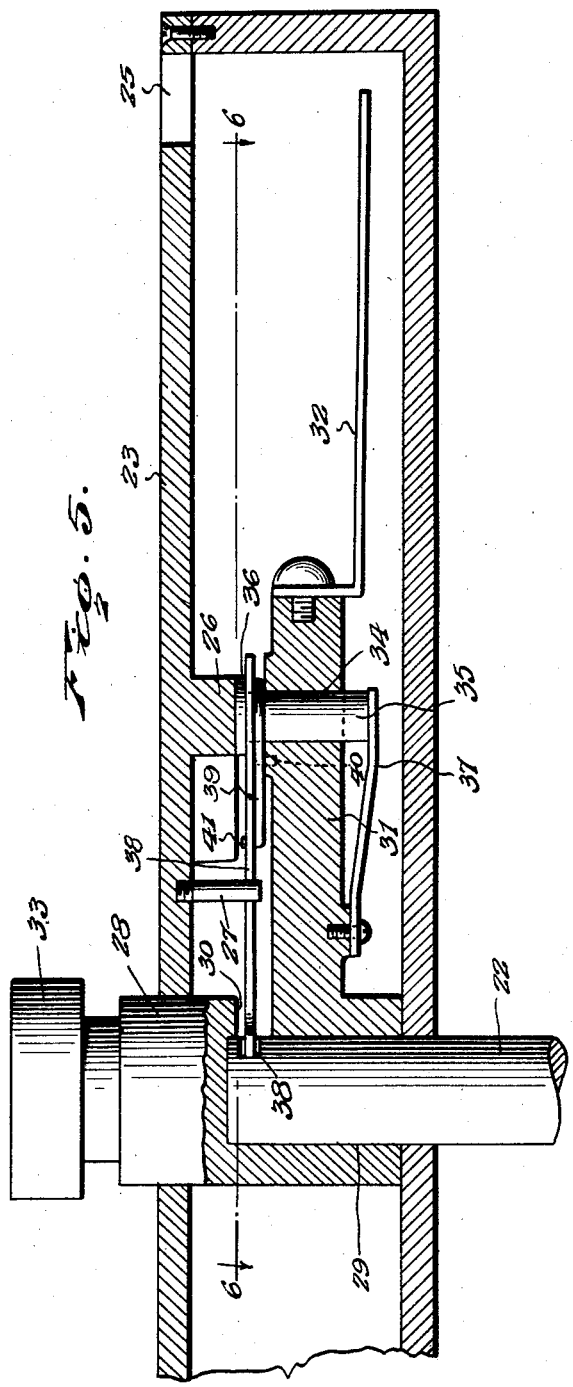
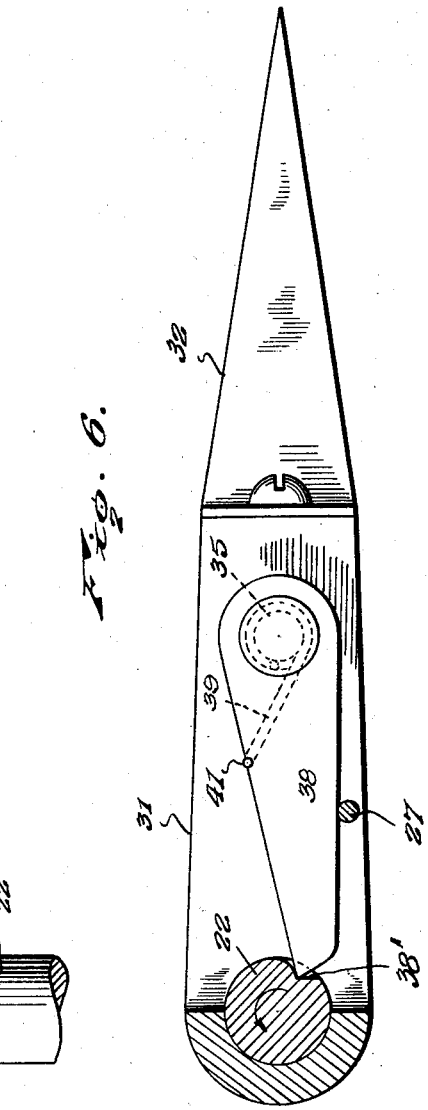
Inventor
F. H. Stroud.
By Lacey & Lacey, Attorneys Patented Nov. 22, 1932

1,888,639

UNITED STATES PATENT OFFICE

FRANCIS H. STROUD, OF SEATTLE, WASHINGTON, ASSIGNOR TO GEORGE WILMONT GRAETZ, OF SEATTLE, WASHINGTON

BRAKE TESTER FOR MOTOR VEHICLE WHEELS

Application filed July 3, 1929. Serial No. 375,671.

The present invention is directed to improvements in brake testers for motor vehicle wheels.

The primary object of the invention is to provide a device of this character so constructed that the vehicle can be driven upon the units of the device to obtain an accurate reading as to the braking resistance.

Another object of the invention is to provide a device of this kind including four independent units so arranged that a vehicle equipped with either two or four wheel brakes can be tested.

Another object of the invention is to provide a device of this kind so constructed that the braking action of individual wheels can be ascertained in order that adjustment can be made to overcome any inequalities of the brakes.

Another and important object of the invention is to provide a brake tester wherein the indicating pointers must be returned to their normal or inoperative position by hand after each testing operation.

With these and other objects in view, this invention resides in the novel features of construction, formation, combination and arrangement of parts to be hereinafter more fully described, claimed and illustrated in the accompanying drawings, in which:

Figure 2 is a plan view, partly in section, of one of the units.

Figure 3 is a longitudinal sectional view therethrough.

Figure 4 is a sectional view on the line 4—4 of Figure 3.

Figure 5 is a sectional view on the line 5—5 of Figure 2.

Figure 6 is a sectional view on the line 6—6 of Figure 5.

Figure 1:
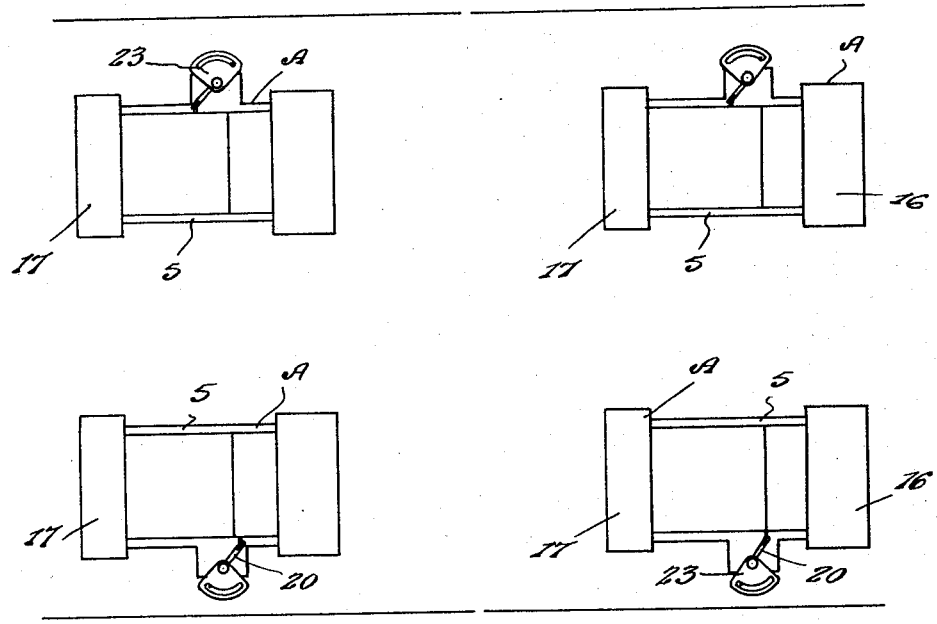
Figure 1 is a plan view showing the relative arrangement of the units.

As shown in Figure 1, four units A are employed, one for each wheel of a vehicle when equipped with four wheel brakes, and since each unit is identical in construction, a description of one will suffice for all.

Each unit includes a foundation 1 in which is formed a pit 2 and in which is supported a pair of parallel spaced channel members 3 for supporting the anti-friction rollers 4. A sheet metal platform 5 is provided and is preferably coated with a layer 6 of cement, said platform having channels 7 formed in its under surface for cooperation with the rollers 4 in order that the platform can roll when subjected to the resistance of the vehicle wheel. A bracket 8 depends from the platform 5 and has threaded therein the front end of a rod 9, the rear end thereof having a piston 10 movable in the cylinder 11, said cylinder being rigidly supported by and between the channel members 3. The rear wall 12 of the cylinder is provided with vents 13 so as to release the pressure as the piston travels on its rear stroke.

A head 14 is supported in the forward end of the pit 2 and a coil spring 15 is interposed between said head and the bracket 8 so as to resist the forward travel of the platform. The spring extends parallel with the direction of movement of the platform.

The front end of the pit is overhung by a tread plate 16 under which the forward end of the platform travels when moving forwardly.

A plate 17 normally overlaps the rear end of the platform 5 so that a wheel can conveniently roll upon the platform when the device is in operation.

It will be obvious that when a wheel rolls upon the platform and the brake is applied, the drag thereof upon the platform will shift the same forwardly, the shock being absorbed by the spring 15, which also serves to move the platform rearwardly after the wheel has passed over the platform, the speed of the rearward movement of the platform being governed by the piston moving rearwardly in the cylinder 11.

To one side of each platform is fixed a bracket 18 having a pin 19 carried thereby for engagement in a slot 20 formed in the horizontal arm 21 fixed to the lower end of the vertical shaft 22, the upper end of which extends into the register casing 23 supported by a standard 24. The bottom wall of the casing has marked thereon suitable graduations B for indicating the action of the brakes, said graduations being discernible through an arcuate sight opening 25 formed in the top wall of the casing. The top wall of the casing has formed upon its under surface an arcuate rib 26 and a stop pin 27, the purpose of which will be later explained.

A head 28 is rotatably engaged in the casing and has a socket 29 formed therein for rotatably receiving the upper end of the shaft 22, said head having a slot 30 formed therein. Formed integral with the head 28 is an arm 31 having a pointer 32 fixed to its outer end for coaction with the graduations B upon the bottom wall of the casing 23. The head 28 has a knob 33 upon its upper end to facilitate rotation thereof.

The arm 31 has a bearing 34 in which is engaged a pin 35 having a head 36 for engaging the rib 26. A leaf spring 37 is provided and has one end fixed to the arm and its free end engaged with the lower end of the pin 35 and serves to hold the head 36 frictionally engaged with the rib 26. Pivotally connected to the pin 35 is a detent 38, the free end of which extends through the slot 30 and is adapted to engage the notch 38' formed in the upper end of the shaft 22. In order to normally hold the detent engaged in the notch 38', a spring 39 is provided and has one end anchored, as at 40, in the arm, and its other end provided with an extension 41 for engaging one side of the detent 37. This spring normally serves to hold the detent yieldably engaged with the stop pin 27.

Briefly, the operation is as follows:

The car to be tested is driven across the units and stopped beyond them. As the wheels encounter the platforms 5, the brakes are applied to arrest the movement of the car. The wheels will then roll upon the platforms if not locked, or slide thereon if locked, whereupon the drag of the wheels upon the platforms will shift the same forwardly, such action causing the brackets 8 to compress the springs 15 and move the pistons 10 forwardly in the cylinders. As each platform moves forwardly, the shaft 22, through the medium of the arm 20, will rotate, and since the detent is engaged in the notch 38', the arm 31 and pointer 32 will swing outwardly and drag the head 36 of the pin 34 over the rib 26. When the forward movement of the platform is arrested and it returns to normal position, the frictional engagement between the head of the pin and the rib will be sufficient to hold the pointer 32 in registration with the graduation B, thus denoting the brake action.

Figure 7:
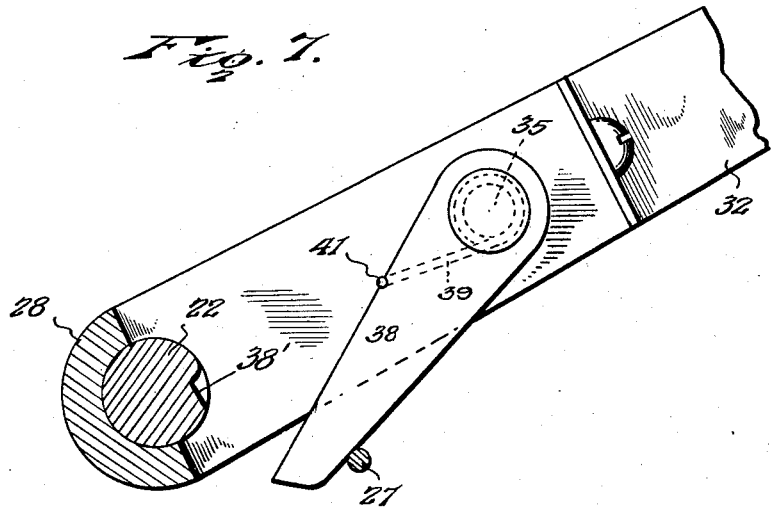
Figure 7 is a plan view of the indicator arm in its released position.

As soon as the reading is obtained, the knob 33 is grasped and the head 28 turned to swing the arm 31 and pointer 32 to reset position. At this time, the shaft 22 has been rotated to cause disengagement of the detent 38 from the notch 38', whereupon the spring 39 swings the detent to the position shown in Fig. 7. Reverse movement of the platform 5 will reverse the movement of the shaft 22 in order that the notch 38' will be properly positioned for again engaging the detent upon turning the head. As the head is turned manually, the arm 31 swings inwardly, during which the detent engages the stop pin 27 to swing the same into engagement with the notch. It will be apparent that the shaft 22 rotates a distance corresponding to the drag of the wheel (with brake set) upon the platform, and that the tension of the spring 39 is sufficient to swing the detent from engagement with the notch 38'.

Since it is necessary to return the pointers to their reset or normal position by hand, after each testing operation, and before the device will again register, the travel of the rear wheels over the forward platforms will in no way disturb the pointers operated thereby.

From the foregoing, it is thought that the construction, operation and many advantages of the herein described invention will be apparent to those skilled in the art, without further description, and it will be understood that various changes in size, shape, proportion and minor details of construction may be resorted to without departing from the spirit or sacrificing any of the advantages of the invention.

What is claimed is:

1. A brake tester for vehicle wheels comprising a platform, means for slidably mounting the platform, said platform having a bracket depending therefrom, a head adjacent the bracket, a coiled spring interposed between the head and bracket and extending parallel with the direction of movement of the platform, a cylinder mounted stationary below the platform, an air check piston slidable in the cylinder, a rod connecting the piston and bracket, said spring serving to resist movement of the platform in one direction when subjected to the drag of a wheel with set brake passing thereover, said piston serving to retard the movement of the platform by said spring in a reverse direction, a register including a pointer and a casing provided with graduations, connections between the platform and pointer for actuating the pointer upon movement of the platform by the vehicle wheel, means for rendering said connections inactive during movement of the platform by said spring, and means for manually resetting the pointer at initial position after each actuation thereof.

2. A brake tester for vehicle wheels comprising a platform, means for slidably supporting the platform, a bracket extending downwardly from the platform, a stationary head below the platform, a helical spring interposed between the head and the bracket and extending parallel with the direction of movement of the platform for resisting a forward movement of the platform when subjected to the drag of a wheel passing thereover with set brake, a stationary cylinder below the platform, an air check piston in the cylinder operatively connected to the bracket for resisting movement of the platform in a reverse direction by expansion of said spring, a shaft, a connection between the shaft and platform for rotating the shaft upon movement of the platform, an arm pivotally connected with the shaft, a casing for the shaft having graduations, a pointer carried by the shaft for cooperating with said graduations, a detent pivotally associated with the arm and normally engaged in a notch in the shaft for swinging the arm and pointer upon rotation of the shaft in one direction, means for disengaging the detent from the notch in the shaft upon reverse rotation of the shaft, and cooperative means carried by the arm and casing for holding said arm and pointer against reverse pivotal movement upon reverse rotation of the shaft.

3. A brake tester for vehicle wheels comprising a platform, means for slidably supporting the platform, a bracket depending from the platform, a helical spring adapted to be compressed by the bracket and extending parallel with the direction of movement of the platform, means for opposing expansion movement of said spring, a casing mounted adjacent the platform and having graduations therein, a shaft extending into the casing, means connecting the shaft and platform for rotating the former upon longitudinal movement of the platform in one direction when subjected to the drag of a wheel, an arm pivotally connected with the shaft and having a pointer connected thereto for cooperation with the graduations, a detent pivotally connected with the arm and having one end detachably engaged in a notch in the shaft, said detent serving to swing the arm and pointer in one direction upon rotation of the shaft, and means for frictionally holding the arm in its shifted position upon the reverse rotation of the shaft.

4. A brake tester for vehicle wheels comprising a slidably supported platform movable in one direction under the action of a wheel with set brake passing thereover, a bracket carried by the platform, a spring adapted to be compressed by the bracket, a cushion device opposing expansion movement of the spring, a register including a casing, said casing having a rib therein, a shaft extending into the casing, connections between the shaft and platform for rotating the shaft upon movement of the platform in one direction, an arm rotatably engaged with the shaft and having a pointer carried thereby, said shaft having a notch therein, a pin carried by the arm and having its head engaged with the rib, means for yieldably holding the pin frictionally engaged with the rib, a detent pivotally connected with the pin and having its free end adapted to detachably engage the notch, said detent serving to swing the arm and pointer upon rotation of the shaft, and resilient means for disengaging the detent from the notch upon rotation of the shaft, said pin serving to hold the arm against reverse rotation.

5. A brake tester for vehicle wheels comprising a slidably supported platform movable in one direction under the action of a wheel with set brake passing thereover, a bracket carried by the underneath face of the platform, a stationary head opposite said bracket, a helical spring extending parallel with the direction of movement of said platform and disposed at the longitudinal axis of said platform between said head and said bracket, movement of said bracket serving to compress said spring, a stationary cylinder on the opposite side of said bracket from said head, a movable air check piston in said cylinder having a piston rod fixed to said bracket whereby said piston opposes movement of said spring in one direction under the impulse of said wheel and returns said platform without shock to normal position under action of expansion of said spring, and a registering device operatively connected with the platform and indicating movement thereof under impulse of said wheel.

In testimony whereof I affix my signature.

FRANCIS H. STROUD. [L. S.]